United States Patent [19]

Wark

[11] 3,969,106
[45] July 13, 1976

[54] SELECTIVE HYDROMETALLURGICAL SEPARATION OF LEAD FROM COMPLEX LEAD-ZINC-COPPER SULFIDE ORES OR DERIVED CONCENTRATES

[75] Inventor: William John Wark, Bridgewater, Canada

[73] Assignee: Zeo-Mag Research Limited, Nova Scotia, Canada

[22] Filed: June 3, 1975

[21] Appl. No.: 583,326

[52] U.S. Cl. .......................... 75/101 R; 75/101 BE; 75/114; 75/115; 75/120; 423/98; 423/89
[51] Int. Cl.² ........................................ C22B 13/04
[58] Field of Search ............ 75/101 R, 101 BE, 120, 75/114, 115; 423/98, 89

[56] References Cited
UNITED STATES PATENTS

| | | | |
|---|---|---|---|
| 1,539,714 | 5/1925 | Christensen | 75/120 X |
| 3,231,503 | 1/1966 | Laue | 75/120 X |
| 3,434,947 | 3/1969 | Steintreit | 75/120 X |
| 3,776,826 | 12/1973 | Atadan | 423/141 |
| 3,785,944 | 1/1974 | Atwood et al. | 75/114 X |
| 3,923,616 | 12/1975 | Atadan et al. | 423/34 |

*Primary Examiner*—G. Ozaki
*Attorney, Agent, or Firm*—Beveridge, DeGrandi, Kline & Lunsford

[57] ABSTRACT

A quantitative hydrometallurgical process for the selective conversion of lead sulfide (galena) to its sulfate form under ambient conditions of temperature and pressure. The process works in the presence of associated zinc - copper - iron sulfides which survive the process in a relatively unaltered condition. It is directly applicable to ores or derived concentrates of complex sulfide systems. The lead sulfate is isolated from the ore or concentrate system by a brine wash with subsequent conversion to lead chloride. A free concentration of cupric ion is maintained during the leaching stages to act as an oxidation catalyst and to inhibit the dissolution of zinc sulfide. The forward reaction in terms of lead sulfation is controlled by a chlorite-type mineral with both anion and cation exchange capacity added to, or maintained in a dilute sulfuric acid leach cycle. The evolution of hydrogen sulfide is inhibited by the reaction rate under aeration conditions in the presence of a rigidly controlled concentration of soluble iron programmed into the leach system by imposed reducing and oxidizing conditions.

28 Claims, 3 Drawing Figures

SELECTIVE LEAD EXTRACTION PROCESS

FIG. 3
SELECTIVE LEAD EXTRACTION PROCESS

SELECTIVE HYDROMETALLURGICAL SEPARATION OF LEAD FROM COMPLEX LEAD-ZINC-COPPER SULFIDE ORES OR DERIVED CONCENTRATES

This invention is based upon a process whereby the lead-bearing sulfide mineral, galena, can be quantitatively and selectively separated from other sulfide minerals such as sphalerite chalcopyrite and pyrite, with which it is frequently associated in nature.

The process offers an alternative to current pyrometallurgical practices, which are employed in the separation and recovery of lead. In this process, the primary association with sulfur is broken under controlled chemical conditions which do not contribute to atmospheric pollution.

The process of this invention is operated under ambient conditions of temperature and pressure, hence, it is not energy intensive. This is an important factor as the economy reaches a level whereby the cost and supply of energy is a critical factor in metal processing. Furthermore, the process is not capital intensive since it employs conventional chemical processing equipment.

Lead is currently being diverted from many of its traditional uses. This invention has the potential to yield lead in new forms which may serve to expedite such a transition.

This invention can be applied to ores, bulk concentrates or selective concentrates containing lead. It is particularly applicable to those complex, fine-grained sulfide ores in a pyritic matrix which do not respond well to selective, flotation practice. An important class of ores of this type are represented by the lead - zinc - copper ores of the Province of New Brunswick, Canada. The recovery of lead from these materials is substantially deficient. Furthermore, the persistence of the lead mineral in association with the zinc and copper fractions, derived from such ores, introduces serious secondary problems in beneficiation and smelting.

The application of this process to crude ores of this type, as mined, has important technical and economic implications. Such a practice yields a substantial improvement in the total recovery of lead. Co-incident with such an improvement in lead recovery, there will be a significant improvement in the grade and recovery of associated zinc and copper sulfide concentrates derived from such ores. Thus, the process is capable of making important social, economic and technical contributions to the economy.

Pyrometallurgical and hydrometallurgical methods are known whereby the sulfur content of lead - zinc sulfide ores, or concentrates derived from them, can be converted to sulfate form. The pyrometallurgical methods are non-selective, energy intensive, and are major contributors to atmospheric polution by oxidized forms of sulfur. Since galena has a relatively low sulfur content, abatement measures can be expensive and may contribute unduly to production costs.

The hydrometallurgical methods are based upon the selective treatment of selected concentrates. Thus, they are dependent on high levels of efficiency in terms of beneficiation. This may be difficult to achieve in the case of a complex finegrained base metal sulfide ore. Alternatively, the hydrometallurgical process may be dependent upon the separation and recovery of the metals of interest, after the oxidation of the associated sulfur to its sulfate form. In these cases, the oxidation of the associated sulfur is obtained by strong non-discriminatory oxidizing conditions, under pressure, or through the use of strong sulfuric acid at oxidizing concentrations.

In such cases, many undesirable metals associated with the system are mobilized in soluble sulfate form, to an extensive degree. Based upon current levels of environmental concern, the disposal or control of such soluble salts would be an adverse feature of these processes.

The process described in this specification is substantially selective towards the lead component in an ore or concentrate. Hence, it does not dissolve undue amounts of associated metals in soluble form. Since the selectivity towards lead is based upon its chemistry in insoluble form, the recycle burden is minimal.

Furthermore, the process permits an option with respect to the forward treatment of associated zinc and copper values. These may be recovered and processed in a conventional flotation-pyrometallurgical sequence, or they may be treated hydrometallurgically with improved efficiency, in a lead deficient system.

The present invention, in its broadest aspect, resides in a hydrometallurgical process for the selective separation of lead values from complex sulfide ores containing lead sulfide (galena) or derived concentrates thereof, which comprises the following steps, in sequence:

1. reacting said sulfide ore or concentrate in finely divided form with a dilute non-oxidizing mineral acid under reducing conditions, and adjusting the system to a pH of 0.5, thereby to extract substantially all readily soluble iron in the system from said ore or concentrate, said mineral acid being added to the system while the ore suspension is being mildly agitated, at a rate such that hydrogen sulfide evolution is substantially inhibited;
2. effecting a liquid-solids separation while maintaining said system under reducing conditions, to remove said readily soluble iron from the system;
3. repulping the solids in dilute sulfuric acid to form an aqueous suspension of said solids, and adjusting the pH of the suspension to a value of 0.5, while contacting said suspension with an oxygen-containing gas under strong conditions of agitation
4. adding to said suspension a water-soluble copper salt in an amount sufficient to yield a free excess of approximately 0.001 gm./liter of cupric ion ($Cu^{++}$) in terms of the aqueous ore suspension system and intimately contacting under strong conditions of agitation said aqueous suspension of ore for a period of 8–10 hours with an oxygen-containing gas in the presence of a naturally occurring insoluble material having a cation exchange capacity of the order of 40 milliequivalents/100 gm. and an anion exchange capacity of the order of 20 milliequivalents/100 gm. whereby there is provided a controlled amount of $Fe^{++}$ in the system and said amount of $Fe^{++}$ is maintained throughout said oxidation step, said lead sulfide being substantially quantitatively converted to lead sulfate;
5. effecting a second liquid-solids separation; and
6. removing the lead values of said ores, present in the solid residue resulting from said second liquid-solids separation in the form of lead sulfate, or lead complexes, from said residue.

The outstanding feature of this process is that it permits the selective conversion of lead sulfide to lead sulfate in the presence of associated zinc, copper and iron sulfides. It has been postulated, based upon thermodynamic data, that selective reactions of this type were theoretically possible. Table I indicates the potential of such a selective solution concept.

TABLE I

| MINERAL | REACTION | | | G° Kcal/mole (298K) |
|---|---|---|---|---|
| Pyrrhotite | Fe S + 2H$^+$ | $\leftrightarrow$ | Fe$^{++}$ + H$_2$S | − 4.87 |
| Pyrite | Fe S$_2$ + 2H | $\leftrightarrow$ | Fe$^{++}$ + H$_2$S + S | +11.65 |
| Sphalerite | ZnS + 2H$^+$ | $\leftrightarrow$ | Zn$^{++}$ + H$_2$S | + 4.32 |
| Galena* | PbS + 2H$^+$ | $\leftrightarrow$ | PbSO$_4$ + H$_2$S | − 2.29 |
| Chalcocite | Cu$_2$S + 2H$^+$ | $\leftrightarrow$ | CU$^{++}$ + Cu + H$_2$S | +28.40 |
| Covellite | Cu S + 2H$^+$ | $\leftrightarrow$ | Cu$^{++}$ + H$_2$S | +19.34 |

*= SULFURIC ACID.

In natural ore systems, it is not possible to achieve the ideal conditions which would make separations based upon the above data practical. The data are of some value, however, in that they aid in the understanding of this invention.

The application of this process is based upon three reaction stages — a reducing phase, an oxidation phase and a lead sulfate separation stage. In the first stage, the finely ground ore or concentrate is reacted with dilute sulfuric acid, in order to extract all readily soluble iron and to initiate responsive displacement reactions at a pH of approximately 0.50 units. In order to establish the quantity of sulfuric acid required for this purpose, a sample of the ore is titrated in an aqueous slurry at a liquid to solids ratio of approximately 2:1. Other densities may be employed and the liquid:solids ratio is not an essential feature of the process. Also, the extent to which the ore or concentrate has been reduced by grinding is not a feature of this invention. Each material submitted to the process should be tested empirically in order to establish the optimum particle size at which a satisfactory quantitative response is obtained.

The invention will now be described herein in more detail, with reference to the accompanying drawings, in which.

Figure 1:
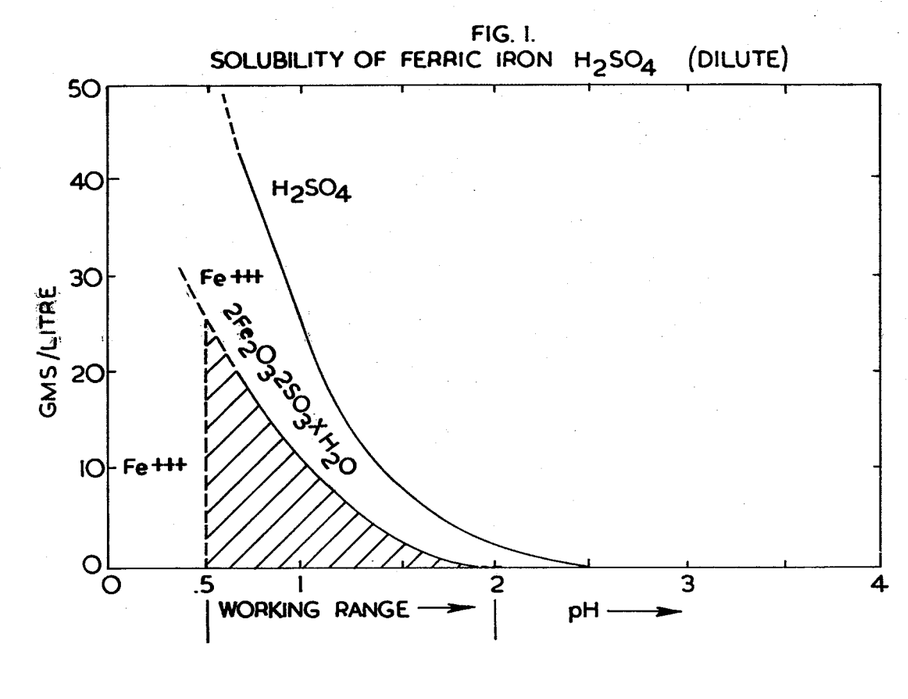
FIG. 1 is a phase diagram showing the solubility relationships of ferric iron in dilute sulfuric acid systems.

During the extraction process, the system is brought to an oxidizing condition. It will be seen from FIG. I that iron in the ferric state in the presence of sulfuric acid has a limited solubility.

This process is dependent on clean mineral surfaces in order to operate efficiently. Therefore, if the quantity of soluble iron is not controlled the following reaction will occur:

6FeSO$_4$ + XH$_2$O + 3O → 3 Fe$_2$ O$_3$. 2SO$_3$. X H$_2$O    1.

The basic ferric sulfate formed in this manner, interferes with the process, if present in excess. In a system of this type it is not desirable or possible to eliminate all the soluble iron. However, it is possible to control its concentration within certain limits.

In order to establish these limits in terms of soluble iron, the system is adjusted to a pH of 0.5 units ± 0.10 units within a thirty minute reaction period, under reducing conditions. This represents the lower limit for this system in terms of free acid concentration.

In order to maximize the iron solubility under these conditions, the acid is added rapidly under non-aerative conditions so as to impose a temporary reducing condition upon the system.

This condition will derive from the presence of galena or other reactive sulfides which readily enter a displacement reaction to yield sulfide ion. Insofar as galena is present this reaction soon ceases due to the formation of an insoluble film of lead sulfate on the galena particles. A detectable incipient over-pressure of hydrogen sulfide indicates the required reducing potential. Once established, the point of overt over-pressure can be avoided by mild aeration during this reaction phase. There is no requirement that hydrogen sulfide be evolved in this process. In fact, it may be avoided, once the initial acid concentration and addition rate have been established.

An important feature of the process is that the acidity is adjusted experimentally so that hydrogen sulfide is not evolved. This is a rate function. Hydrogen sulfide evolution is inhibited by oxidizing it to sulfate before it is evolved from the solution. Hydrogen sulfide is highly noxious and toxic. Therefore, its evolution should be inhibited by oxidation to sulfate (i.e. sulfuric acid in this case). This is an important feature since if H$_2$S were to be evolved the gas would have to be controlled by some extraneous process. Thus the first stage has two features — dissolution of readily soluble iron and control of hydrogen sulfide evolution by controlling the rate of acid addition and the aeration condition.

If the amount of acid required to achieve a free sulfuric acid concentration equivalent to a pH of 0.50 units is deemed to be excessive, the feedstock should be subjected to a mineral dressing procedure designed to lower this value to acceptable limits.

In the case of the massive pyritic ores of the New Brunswick type, it has been found that subsidiary mineral dressing procedures are rarely necessary.

The acid used in the first stage of the process need not necessarily be sulfuric acid, although this is preferred. Any strong mineral acid, for instance hydrochloric acid, may be employed for this purpose.

In the event that a minor content of pyrrhotite is present in the ore, it is treated as being soluble iron, since the acid displacement reaction which has been established will readily dissolve it. If the pyrrhotite content is excessive it may be selectively removed prior to initiating the lead sulfation reaction.

Figure 3:
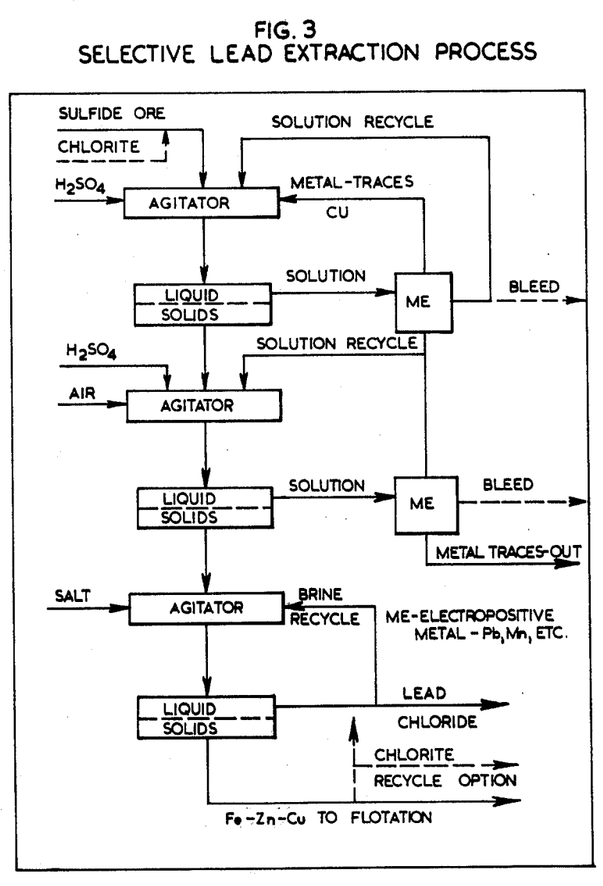
FIG. 3 is a schematic flow diagram illustrating in block form a method of processing a complex lead-zinc-copper sulfide ore, so as to obtain selective extraction of the lead component.

When the lower limit of acid consumption in terms of iron soluble at a pH of 0.5 units has been established; a liquid-solids separation is performed. The solution derived from this separation contains a potentially valuable free acid content and should be recycled in closed circuit. In addition to iron, the solution will contain other soluble materials responsive to dissolution at this pH level. These may be recovered or discarded as indicated by economic evaluation. FIG. III shows the recommended circuit design for the full process in terms of recycle streams.

Minor deviations from the recommended acid concentration, for the reducing phase of the process, are permissible and unavoidable in certain cases. The important parameter to establish is a quantitative relationship between readily soluble iron and readily initiated displacement reactions at an established pH value, which is not substantially exceeded.

When the readily soluble iron in the system, at the established level, has been separated from the solids, the residue is repulped in dilute sulfuric acid and the pH readjusted to 0.50 units under intense aerative conditions. A sulfuric acid concentration of approximately 0.32M is adequate at this stage of the process. In order to effect the selective dissolution of lead sulfide, the following reaction is indicated.

$$Pb(s) + 2H^+ + SO_4^= \rightarrow PbSO_4 + H_2S(g) \qquad 2.$$

The free energy of this reaction is $\Delta G \stackrel{\circ}{=} -2.29$ k cal/mole. Thus, the reaction has the tendency to proceed spontaneously forward. However, the products, being lead sulfate and hydrogen sulfide, are relatively insoluble in an aqueous system and quickly bring this reaction to an equilibrium condition.

Figure 2:
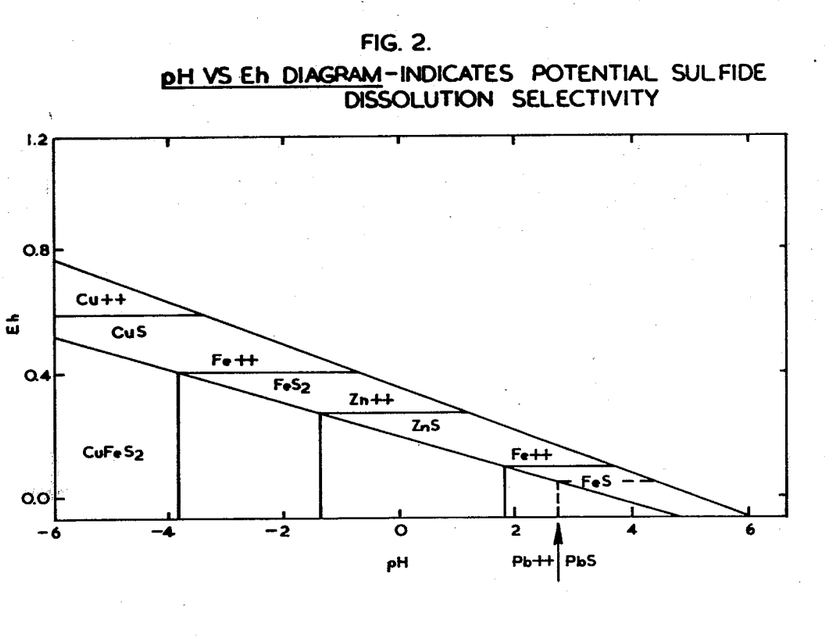
FIG. 2 is a phase diagram showing the solubility phases of various common base metal sulfides in terms of oxidation potential and acidity in aqueous systems.

According to the Le Chatelier Principle, the reaction equilibrium condition can be changed by increasing the concentration of reactants or decreasing the concentration of products. If the concentration of sulfuric acid is increased, the domain of sphalerite response to a displacement reaction will be encountered (FIG. II). Accordingly, the reaction should be controlled by adjustment of the products.

In order to achieve this effect, the hydrogen sulfide is oxidized by aeration to yield elemental and/or sulfate ion. The actual mechanism of this reaction is rather complicated and probably involves a number of intermediate stages with catalytic effects. The pertinent half cell reactions are as follows:

$$H_2S \rightarrow S + 2H^+ + e = -0.14 \text{ Volts}$$
$$O2^- \rightarrow O_2 + e = 0.56 \text{ Volts}$$

Thus, at a positive oxidizing potential of approximately 0.40 volts, the hydrogen sulfide can be converted to an oxidized form. This conversion induces a tendency in the system for the displacement reaction with galena to proceed in a forward direction. However, a new equilibrium condition is eventually imposed in terms of the insoluble lead sulfate product. In turn, this equilibrium is overcome by an ion exchange reaction which will be explained in a subsequent section of this specification.

Referring to FIG. II, it will be seen that under the proposed Eh and pH values for the process, sphalerite (Zn S) is vulnerable to dissolution. This is prevented by exposing all the sulfide minerals in the system to an exchange reaction, based upon the solubility product principle, whereby the sulfide mineral surfaces are inhibited by a film of covellite (Cu S). This is accomplished by adding a pre-established quantity of cupric ion ($Cu^{++}$) in soluble form to the system. The addition of $Cu^{2+}$ in the oxidizing stage is vital to the invention. The $Cu^{++}$ can be derived from any soluble copper salt. The criterion here is that the $Cu^{++}$ ion be immediately available for reaction, i.e., it must be water soluble. Of course, the copper salt could be dissolved separately and be metered into the extraction circuit at the appropriate point. However, it is handled, it must be instantaneously available to immobilize the zinc sulfide (sphalerite) by forming an unsoluble cupric sulfide film on the surface of the sphalerite. If one were to add an insoluble copper bearing salt such as a sulfide, or copper metal, it would not be sufficiently in ionic form at the outset of the oxidation step. Eventually some if it would dissolve and it would function. However, by this time some zinc would have dissolved and selectivity would have been lost. In order to establish the correct proportion for the exchange reaction; whereby a film of covellite is formed, the amount of cupric ion is determined in each case experimentally. Once the correct value for a given ore or concentrate has been identified, no further monitoring is required. The correct amount of cupric ion is determined by a simple adsorption test. This determination is made under an aerative condition since cuprous ion does not effectively substitute in a stable manner in divalent sulfide lattices. As an example, the pertinent reaction between zinc sulfide and cupric ion is as follows:

$$ZnS + Cu \rightleftharpoons Cu S + Zn^{++}$$

The equilibrium constant for this reaction may be determined from the solubility product as follows:

$$K = \frac{(Zn^{++})}{(Cu^{++})} = \frac{Ks.p. \; ZnS}{Ksp \; CuS} = 6.1 \times 10^{16}$$

The dimension of this constant indicates that the conversion of zinc sulfide to cupric sulfide is sensibly quantitative. Similarly, due to the large differences in solubility product, the other sulfide minerals present are subjected to inhibition in terms of dissolution, by the emplacement of an insoluble cupric sulfide film. For each sulfide mineral, there will be a specific value for the equilibrium constant. Furthermore, the degree of adhesion of this film will vary with the chemical and crystalline properties of the individual sulfide minerals in the system and the established hydrogen ion concentration. Due to the special crystal properties of sphalerite, the adhesion and persistence of the cupric sulfide film is especially competent.

Although hydrogen ion is not shown in the exchange reaction, desorption of cupric ion will occur below a pH of 0.5 units. This is one of the considerations which has been employed in the establishment of the lower limits of acidity for this process.

The amount of cupric ion required to achieve this inhibition is relatively low since a monomolecular layer is the effective inhibitory dimension on the sulfide surfaces. In general, a free detectable concentration of cupric ion of the order of 0.001 gm/liter, in terms of the aqueous ore suspension system should be satisfactory. Normally, this concentration will prevail with the addition of 0.01% copper in terms of the solid component of the suspension.

As stated, the degree to which the covellite layer will inhibit the various sulfides in the system is a function of the chemical and physical properties of the individual sulfide species. In the case of galena, the inhibitory effect is sensibly negligible for the following reasons. In the presence of a non-oxidizing acid, galena responds with a displacement reaction. Thus by employing sulfuric acid at a non-oxidizing concentration, the competent emplacement of a covellite layer is prohibited by the formation of an insoluble lead sulfate film on the galena surfaces. Under oxidizing conditions, cupric ion acts as an electron-transfer catalyst. Since galena is an ionic crystal of good conductivity, it cannot act as a competent catalytic support for the oxidation-reduction system $Cu^{++} \rightleftharpoons Cu^+$ at the established pH.

Based upon these considerations, the galena particles are not effectively inhibited by cupric ion under the established parameters of the process and will respond selectively to the chemistry of the system by sulfation.

Ores or concentrates assigned to this process, which contain copper in the form of chalcopyrite, will be partially self-inhibiting in terms of zinc dissolution. This is not valid in terms of feedstocks which contain copper in the form of covellite or chalcocite. This may be understood by using the dualistic system of mineral notation for chalcopyrite as follows: CuS. FeS. Thus the mineral contains iron in sulfide form and will partially dissolve as its surfaces convert to covellite under an oxidizing condition.

Until such time as this condition is reached, the sphalerite is unprotected and will dissolve. Thus, this mode of operation will result in some zinc dissolution. The potential simplification of the process, by utilizing chalcopyrite "in situ" as the inhibitor will be reflected in relatively high soluble zinc levels in the solutions. These are quite difficult to clean up for recycle and some of the potential economic advantage is lost. Similar considerations apply in the use of copper scrap as a source of cupric ion, consigned directly to the process. None of these considerations are pertinent as to the copper source such as chalcopyrite or scrap, if the copper is dissolved or recovered in a separate unit operation. Economies may be effected in this manner. However, the amount of cupric ion required in the process is very low and each case should be considered on its own merits in terms of this reagent.

Iron plays a very important role in the oxidizing stage of the process. For discussion, the iron in the system can be considered as falling into two separate categories: (a) readily soluble iron which must be removed in the first stage of the process to restrict the oxidation level of the system; (b) soluble iron obtained by a controlled dissolution of iron, derived from a number of sources in the system, for instance, pyrite. Only prolonged and intense contact with acid frees iron from these sources.

If the readily soluble iron were not removed from the system, the oxidizing potential of the system would be above the level at which unwanted constituents would dissolve, and all the minerals would eventually dissolve. The control of the quantity of iron present is one way of controlling the selectivity of the reaction. This is a very important feature. Otherwise, some zinc and copper will dissolve, which is not desired.

The oxidation stage, during which the lead sulfide is converted to lead sulfate, is relatively slow, requiring a period of 8–10 hours. Throughout this stage, air is vigorously introduced into the system. Air is the preferred oxidizing medium; however, any oxygen-containing gas may be employed for this purpose.

Since it is proposed to operate this process under ambient conditions of temperature and pressure, an oxygen carrier is required in the oxidation stage. The most efficient carrier for this purpose is the oxidation-reduction system ferrous-ferric iron. Since all the readily soluble iron has been removed from the system, under the recommended procedure, it is necessary to derive this iron from another source. This is accomplished by adding to, or leaving in, the ore or concentrate under treatment, a clay-type mineral preferably of the chlorite family.

Chlorite is composed of two layers, one being of the mica type with a formula as follows: $(OH)_4 (Si\ Al)_8 (Mg\ Fe)_6\ O_2$. The other layer is of the brucite type being $(Mg\ Al)_6 \cdot (OH)_{12}$. The magnesium in the brucite layer is frequently substantially replaced by iron, usually in the ferrous condition, especially in association with base metal deposits. Thus, this mineral can be employed in a cation exchange reaction in a ferrous state against hydrogen ion to yield iron ions. If the mineral is not in a natural ferrous exchange cycle, it can be treated with a soluble ferrous salt to ensure that the mineral contains $Fe^{++}$ ions. However, in the vicinity of sulfide bodies the chlorite mineral in the gangue, waste rock, flotation tailings, etc. may be utilized. It is a common constituent of many important base metal deposits as a constituent of the ore, or wall-rock, schist or shale.

Chlorite has a number of outstanding properties, in the function for which it has been selected. First of all it is not soluble in the acid concentrations employed. Secondly, the exchange reaction is very slow, requiring up to ten hours for equilibrium. This rate is compatible with practical hydrometallurgical agitation cycles. Finally, it does not disperse readily, hence does not interfere with filtration rates. If indicated, the chlorite can be operated in either closed or open circuit. Chlorite is an important and common soil constituent, so that its disposal does not introduce pollution problems. Other clay minerals or materials with exchange capacity in an iron cycle could be employed in this process. For instance, zeolites are also very satisfactory for this purpose, as they have excellent ion-exchange properties. Zeolites are a well known class of silicate minerals; more specifically, they are a particular class of aluminosilicate compounds with well-defined crystal structures. For further information on these materials the reader is referred to the discussions contained in *McGraw-Hill Encyclopedia of Science and Technology*, Vol. 14, McGraw-Hill Book Co. (1971), pp. 696–698, and the references referred to therein; and the article in *Encyclopedia Britannica*, 1974 Edition, Macropedia, Vol. 19, Encyclopedia Britannica, Inc. pp. 1139–1143; and to the references referred to therein. If a zeolite is used in the process, and the zeolite does not contain $Fe^{++}$ ions within its lattice framework, the zeolite is treated with a soluble ferrous salt. However, the exchange rate factor and the solubility factor indicate that chlorite is a suitable material for this process. Frequently, the ore in its natural state, without beneficiation, will contain sufficient chlorite for this process. In these cases, the lead extraction is applied directly against the crude ores. For convenience in this description the symbol "Ch." will be employed to indicate chlorite with the brucitic layer in a ferrous exchange position.

In the presence of sulfuric acid the following reaction occurs under aerative conditions.

$$H_2SO_4 + Fe(Ch) \rightarrow FeSO_4 + H_2(Ch)$$
$$2FeSO_4 + H_2SO_4 + O(AIR) \rightarrow Fe_2(SO_4)_3 + H_2O$$
$$Fe_2(SO_4)_3 + H_2S \rightarrow 2FeSO_4 + H_2O + S.$$

Thus, the evolution of hydrogen sulfide is prevented and gas pressure will be relieved against the lead sulfide displacement reaction. Also, the finely dispersed clay fraction in the system desorbs, by ion exchange, the insoluble lead sulfate film on the surface of the galena as follows:

$$Pb\ SO_4 + H_2(Ch) \rightarrow Pb(Ch) + H_2SO_4$$

The solubility gradient established by the solubility product of lead sulfate and the ion exchange capacity of chlorite in a hydrogen cycle will effectively desorb the products. On this basis, the displacement reaction with lead sulfide and dilute sulfuric acid will proceed to the right as predicted by the Le Chatelier Principle. Also, since chlorite has a substantial anion exchange capacity, the oxidation of sulfide to higher oxidation states may occur on the clay exchange sites so that elemental sulfur does not accumulate at the electrical double layer on the mineral interface, thereby inhibiting the reaction.

Chlorite type minerals have ion exchange capacity in terms of cupric ion as well as iron. Thus, the exchange capacity in cupric ion acts as a reserve against potential breakdown in the inhibition of zinc solubility by covellite. This function is of importance since as the chemical reaction proceeds towards the equilibrium condition, new mineral surface areas are being exposed, as the galena sulfates and desorbs. Such surfaces are immediately restored by the cupric ion reserve on cationic exchange sites.

Zinc in soluble form is a relatively difficult metal to handle in recycle streams, in low concentrations. Thus, its quantitative inhibition in the solid state is an important feature of this process.

Clay-type, e.g. chlorite minerals, or zeolites, suitable for use in the process of this invention should have a minimal cation exchange capacity of the order of 40 milliequivalents/100 gms and an anion exchange capacity of the order of 20 milliequivalents/100 gms. On this basis, the system can be adjusted to a clay content of from 10 – 20%, yielding iron equivalence of from 1 – 2 gms. soluble iron per liter.

Based on the objective that all of the iron is in a ferric state at the end of the sulfation or oxidation stage, and that no iron is desired in the brine wash stage, filtration should occur at a maximum of 1.5 pH units. One of the reaction products, being lead sulfate, is relatively insoluble. Hence, an important feature of this process is the chemical stability of the ion exchange component, under the established process conditions. A slow ion exchange rate is desired so that desorption and nucleation are compatible in terms of the equilibrium condition. On this basis, the chlorite type ion exchange is preferred.

As indicated by economic and technical considerations the ion exchange component can be isolated by established separation procedures, such as the use of a hydrocyclone, and be re-programmed for use in closed circuit.

In practicing this process, the objective is to obtain the maximum sulfation of the lead in the sulfation or oxidizing stage. Further dissolution of the lead will occur in the brine wash stage by complexing action. However, there is a potential for zinc dissolution and hydrogen sulfide evolution in an acidulated wash phase, if the sulfation of the lead has not been optimized in the sulfation stage. A modification of the process is based upon combining stages I and II or stages I, II and III but this action leads to loss of selectivity and difficulties in solution recycle. The preferred procedure for selectivity is based upon separation of each stage.

When the sulfation stage has been completed, a liquid-solids separation is performed and the solids are advanced to the brine wash stage. The second (oxidation) stage results in sulfation of the lead, which is in the form of insoluble lead sulfates. Naturally, this will be dispersed through the solid phase. At this point the following will have been accomplished: (1) lead sulfide will be converted to lead sulfate; (2) pyrite, sphalerite, chalcopyrite will be unaffected; (3) in the conversion of (1) above, there is a change in crystal structure and the cementing action of the lead sulfide in the original ore or concentrate is eliminated. (This is equivalent to obtaining selective liberation by grinding). In other words, as we convert lead sulfide to sulfate we alter the physical associations vis-a-vis galena → pyrite, galena → sphalerite, galena → chalcopyrite, galena → gangue.

After the lead is sulfated, the solids are washed with a chloride solution. In order to improve the solubility, this solution is desirably heated to 60°–70°C, but it is not actually necessary to heat the solution; it merely improves solubility. Otherwise, the process operates under ambient conditions.

Lead sulfate has limited solubility in aqueous solutions, being of the order of 0.0028 gms/100 gms at normal temperatures. This level of solubility is too low to be of practical value in a separation process. In order to overcome the limited solubility of lead in its sulfate form, the lead II ion is complexed to a more soluble chloride form. Any chloride system which is soluble can be used to effect the complexing reaction. For instance, the brine solution may be comprised of potassium, ammonium or manganese chloride or of one of the primary components of the ore system in chloride form. In the practice of this process, it is preferred to employ a strong sodium chloride solution at a concentration of approximately 300 gms/liter. Sodium chloride has the advantages of being inexpensive and it has a relatively uniform solubility across a wide temperature range. The pertinent reaction is indicated as follows:

$$Pb\ SO_4 + 3\ Na\ Cl \rightarrow Pb\ Cl_3 + Na_2SO_4 + Na^+$$

In the presence of excess chloride ion the lead solubility will increase beyond the concentrational level of the normal chloride to yield solubilities of the order of 10 – 20 gms/liter of lead depending on temperature and chloride ion concentrations. At this level, the solubility of the lead reaches a practical level which can be employed in the practice of the process.

One of the advantages inherent in transferring the solids from a dilute sulfuric acid to a brine solution, resides in the separation of soluble sulfates which occurs at this stage in the process. This separation may be of commercial value in the recovery of by-products or the treatment of recycle streams.

In order to obtain a level of relative solubility in terms of potential interference from insoluble hydrated oxides, the brine solution is slightly acidified with dilute sulfuric acid. An acid concentration of 0.01M is adequate for this purpose.

The contact time in the brine phase is partially a function of the efficiency of sulfation obtained in the oxidizing stage. Additionally, the contact time between the lead sulfate bearing material and the brine solution will be partially dependent on the complexity of the original mineral texture. In practice, we have found that a quantitative extraction of the lead can be obtained in a contact time ranging from 1 – 4 hours.

By controlling the advance of soluble sulfates in the system by a two-stage operation, the brine solution can be operated at elevated temperatures of the order of 65°C. A resultant cooling of this solution will yield a crop of relatively pure lead chloride crystals. A periodic removal of soluble sulfates from the brine solution may be required. Alternatively, a bleed system may be employed to control the concentration of sulfate ion in order to ensure the precipitation of the lead as the normal chloride, rather than the sulfate.

The lead chloride, derived in this manner, can be reduced to recover lead metal by a number of methods as is well known to those skilled in this art.

Three elements follow the chemistry which has been outlined in the afore-described process. These are lead, silver and mercury. Silver is frequently associated with galena so that it will follow this process. Thus, the foregoing process using a brine wash feature is not fully selective to lead but would also carry silver. Since many lead ores are important silver ores, this is at least potentially an important aspect of the present invention.

Many galena bearing ores are rich in silver. The silver is contained within the galena crystal and as it dissolves to sulfate the silver would be freed and probably is converted to silver sulfide. In other words, it would act in a manner similar to cupric ion and resurface the main sulfide components in the leach, as silver sulfide. Under oxidizing conditions some of this silver would become responsive to the brine washing step since silver forms soluble complexes with chloride ion. Thus, there is inherently present in the process (based on a chloride wash) the capacity to recover silver.

If the silver content associated with the galena in the feed-stock is of interest, it will respond to the imposed chemical conditions and it may be stripped from the brine solution by a unit operation in series based upon a displacement reaction effected by contact with finely divided lead metal, in closed circuit with recycle of the brine wash solution. Similarly, the soluble copper in the system may be stripped by contact with lead metal and be recycled in closed circuit in order to effect economies with respect to this reagent. Following the lead extraction, the solids may be advanced to a standard flotation procedure for the recovery of zinc and copper.

By the term "closed circuit", as used in this specification, is meant a process wherein a material or reagent is kept within the operational confines of a processing circuit, i.e. is recycled. This is as opposed to the term "open circuit", as employed herein, by which is meant a process wherein a material being treated is advanced through the process either to waste or to further different processing, or to market.

The extraction of the lead component in accordance with the present invention renders the zinc sulfide component remaining in the system exceptionally amenable to subsequent recovery of zinc values by a standard flotation procedure. For example, it has been possible to increase the recovery of zinc from the massive pyritic fine-grained complex sulfide ores of the province of New Brunswick, Canada, from 60% to 95% by preliminary application of this selective lead extraction process.

It is not essential to treat the solid residue from the second liquid-solids separation with a chloride washing solution to recover the lead. For instance, separation could be accomplished by using ammonium salts (to form complexes) or by separating the lead sulfate by a froth flotation procedure.

In the following examples, used to illustrate this process, a sulfation cycle with dispersed air in the system was employed for a period of ten hours at room temperature. The liquid: solids ratio was 2:1 with the solids ground to pass a 200 mesh sieve. The brine wash phase was maintained for four hours with aeration at 65°C, based upon a saturated sodium chloride solution. In all cases, the solutions were agitated at approximately 750 R.P.M. The aeration factor was empirically established at the point of incipient foaming.

In all cases, the material used in these tests was characteristic of the massive pyritic complex sulfide ores of the Province of New Brunswick, Canada. The samples employed in the tests were freshly mined ores. The head values were as follows:

| Copper | Lead | Zinc | Iron | Sulfur |
|---|---|---|---|---|
| 0.35% | 4.50% | 8.10% | 35.30% | 37.50% |

EXAMPLE NO. 1

The ore as received was committed to the full sulfation and brine wash cycles without adjustment in terms of chlorite content (10%), cupric ion addition or adjustment in terms of soluble iron. Under these conditions, 5% of the copper, 10% of the lead and 30% of the zinc was extracted.

EXAMPLE NO. 2

The soluble iron content of the ore, as received, was removed from the sample under a reducing condition at pH 0.50. All other conditions in the test were standard. The results were 5% of the copper, 90% of the lead and 20% of the zinc were extracted.

EXAMPLE NO. 3

Conditions as outlined in example No. 2 were imposed. However, in this test an amount of copper in the form of copper sulfate to the level of 0.01% of the weight of solids was added at a pH of 0.50 during the oxidation stage. The results were 3% of the copper, 95% of the lead and 0.0% of the zinc were extracted.

EXAMPLE NO. 4

The chlorite content of the ore was reduced by a decantation procedure. The soluble iron content was removed and 0.01% copper ion was added as an inhibitor. The results were as follows: 5% of the copper, 30% of the lead and 5% of the zinc were extracted.

EXAMPLE NO. 5

A lead concentrate containing 25.2% lead, 5.7% zinc, 4.58% copper was prepared. The soluble iron was extracted, soluble copper was added and the concentrate was adjusted to contain 20% impure chlorite. The concentrate was submitted to the process with the following results: 10% of the copper, 96% of the lead and 0.0% zinc were extracted. These results serve to indicate that upon imposition of the recommended conditions, as described, an acceptably quantitative selective extraction of lead can be made from complex sulfide mineral systems.

I claim as my invention:

1. A hydrometallurgical process for the selective separation of lead values from complex sulfide ores containing lead sulfide (galena) or derived concentrates thereof, which comprises the following steps, in sequence:

1. reacting said sulfide ore or concentrate in finely divided form with a dilute non-oxidizing mineral acid under reducing conditions, and adjusting the system to a pH of 0.5, thereby to extract substantially all readily soluble iron in the system from said ore or concentrate, said mineral acid being added to the system while the ore suspension is being mildly agitated, at a rate such that hydrogen sulfide evolution is substantially inhibited;
2. effecting a liquid-solids separation while maintaining said system under reducing conditions, to remove said readily soluble iron from the system;
3. repulping the solids in dilute sulfuric acid to form an aqueous suspension of said solids, and adjusting the pH of the suspension to a value of 0.5, while contacting said suspension with an oxygen-containing gas under strong conditions of agitation;
4. adding to said suspension a water-soluble copper salt in an amount sufficient to yield a free excess of approximately 0.001 gm/liter of cupric ion ($Cu^{++}$) in terms of the aqueous ore suspension system, and intimately contacting under strong conditions of agitation said aqueous suspension of ore for a period of 8–10 hours with an oxygen-containing gas in the presence of a naturally occurring insoluble material having a cation exchange capacity of the order of 40 milliequivalents/100 gm. and an anion exchange capacity of the order of 20 milliequivalents/100 gm. whereby there is provided a controlled amount of $Fe^{++}$ in the system and said amount of $Fe^{++}$ in the system and said amount of $Fe^{++}$ is maintained throughout said oxidation step, said lead sulfide being substantially quantitatively converted to lead sulfate;
5. effecting a second liquid-solids separation; and
6. removing the lead values of said ores, present in the solid residue resulting from said second liquid-solids separation in the form of lead sulfate, or lead complexes, from said residue.

2. A hydrometallurgical process as in claim 1 wherein said naturally occurring material having ion exchange capacity is chlorite.

3. A process as in claim 2 wherein the chlorite used in the oxidation stage as the ion exchange material is present as a constituent of the ore being treated, said ore not being subjected an any benefication before treatment in accordance with said process.

4. A process as in claim 2 wherein the chlorite used in the oxidation stage as the ion exchange material is obtained from material selected from one of the following: wall rock, shale, schist, soil and flotation tailings.

5. A process as in claim 1 wherein said oxygen-containing gas is air.

6. A process as in claim 1 wherein step (6) comprises contacting the separated solids containing the lead sulfate with an aqueous chloride solution, thereby to effect removal of the lead values from said solids in the form of a soluble lead chloride complex.

7. A process according to claim 4 wherein the aqueous chloride solution is a strong sodium chloride brine solution.

8. A process as in claim 6 wherein the contacting of separated solids with said aqueous chloride solution is effected for a period ranging from 1 to 4 hours.

9. A process as in claim 8 wherein the chloride solution is a saturated sodium chloride solution, maintained at a temperature of about 65°C., and aeration and agitation of the solids-liquid suspension are effected throughout the contacting step.

10. A process as in claim 6 wherein said aqueous chloride solution is slightly acidified with dilute sulfuric acid.

11. A process as in claim 6 wherein said aqueous chloride solution employed for removing lead values from said solids is heated to a temperature ranging from 60° – 70°C.

12. A process according to claim 6 wherein said galena-containing complex sulfide ores or derived concentrates thereof also contain silver intimately associated with the galena, and said silver is converted during the course of the process to a water-soluble silver compound; and is subsequently stripped from the brine solution by means of a unit operation in series, based upon a displacement reaction effected by contact with finely divided lead metal, with recycle of the brine solution.

13. A process according to claim 6 wherein, in addition to recovery of lead values, soluble copper is stripped from the brine by contact with lead metal and is recycled in closed circuit for further use in the process.

14. A process as in claim 1 wherein step (6) comprises converting the lead sulfate in the separated solids to a soluble complex by contacting with ammonium salts, thereby removing the lead values from said solids as a soluble complex.

15. A process as in claim 1 wherein step (6) comprises removing the lead sulfate from said separated solids by froth flotation.

16. A process as in claim 1 wherein, in step (3) and throughout oxidation step (4), the aqueous suspension of solids is continuously aerated.

17. A process as in claim 1 wherein the naturally occurring insoluble material having ion exchange capacity is a clay-type mineral.

18. A process as in claim 17 wherein said clay-type mineral is added to the ore or concentrate being treated.

19. A process as in claim 1 wherein the naturally occurring insoluble material having ion exchange capacity is a zeolite.

20. A process as in claim 1 wherein the mineral acid employed in step (1) is sulfuric acid.

21. A process as in claim 1 wherein the mineral acid employed in step (1) is hydrochloric acid.

22. A process as in claim 1 wherein the soluble copper salt is added to the suspension during the oxidation step while aerating said system.

23. A process as in claim 22 wherein sufficient of said copper salt is added to yield approximately 0.01% cupric ion in terms of the solids in the mineral suspension.

24. A process according to claim 1 wherein the ore feedstock is initially subjected to a suitable mineral dressing procedure designed to reduce the readily soluble iron content of said feedstock.

25. A process as in claim 1 wherein said naturally occurring insoluble material is treated with a soluble ferrous salt before it is used in step (4) of the process, thereby to ensure that said material contains $Fe^{++}$ ions.

26. A process as in claim 1, wherein oxidation step (4) is continued until the pH of the suspension rises to approximately 1.5, at which point the second liquid-solids separation is performed.

27. A process according to claim 1 wherein the acid solution obtained from said first liquid-solids separation is recycled in closed circuit 28. A process as in claim 1 wherein following said second liquid-solids separation step, the cation exchange material employed in the oxidation stage of said process and which is a component of the residue from step (5), is isolated and recycled in closed circuit for further use in step (4) of the process.

* * * * *